US011412089B1

(12) United States Patent
Elmasry

(10) Patent No.: US 11,412,089 B1
(45) Date of Patent: Aug. 9, 2022

(54) LARGE VOLUME VOICE OVER IN INTERNET PROTOCOL SERVICES FOR AN AIRCRAFT

(71) Applicant: Rockwell Collins, Inc., Cedar Rapids, IA (US)

(72) Inventor: George F. Elmasry, San Marcos, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 15/594,324

(22) Filed: May 12, 2017

(51) Int. Cl.
*H04M 7/00* (2006.01)
*H04L 65/1053* (2022.01)
*H04L 65/10* (2022.01)
*H04L 65/1045* (2022.01)
*H04L 65/1023* (2022.01)
*H04W 84/00* (2009.01)
*H04L 49/90* (2022.01)

(52) U.S. Cl.
CPC ...... *H04M 7/0066* (2013.01); *H04L 49/9036* (2013.01); *H04L 65/103* (2013.01); *H04L 65/105* (2013.01); *H04L 65/1006* (2013.01); *H04L 65/1053* (2013.01); *H04W 84/005* (2013.01)

(58) Field of Classification Search
CPC ............ H04M 7/0066; H04M 7/0063; H04W 84/005; H04L 65/1006; H04L 65/103; H04L 65/105; H04L 65/1053; H04L 49/9036
See application file for complete search history.

(56) References Cited

U.S. PATENT DOCUMENTS

| 6,856,613 | B1 * | 2/2005 | Murphy | H04L 29/06027 370/352 |
| 6,970,450 | B1 * | 11/2005 | Scott | H04L 29/06 370/352 |
| 7,002,993 | B1 * | 2/2006 | Mohaban | H04L 29/06027 370/356 |
| 7,113,780 | B2 * | 9/2006 | McKenna | H01Q 1/007 455/431 |
| 8,495,240 | B2 * | 7/2013 | Nelson | H04B 7/18506 709/236 |
| 8,594,075 | B2 | 11/2013 | Elmasry | |
| 9,967,306 | B1 * | 5/2018 | Zhou | H04L 65/607 |
| 2003/0193950 | A1 * | 10/2003 | Philips | H04L 29/06 370/392 |
| 2004/0142658 | A1 * | 7/2004 | McKenna | H01Q 1/007 455/11.1 |
| 2007/0016344 | A1 * | 1/2007 | Stefani | H04M 7/006 701/3 |

(Continued)

*Primary Examiner* — Jeffrey M Rutkowski
*Assistant Examiner* — Jasper Kwoh
(74) *Attorney, Agent, or Firm* — Suiter Swantz pc llo

(57) ABSTRACT

A voice over internet protocol (VoIP) system for an aircraft includes a ground gateway, an aircraft gateway disposed on the aircraft, and a service provider network disposed on the aircraft. The ground gateway is in communication with the aircraft gateway via the service provider network. The aircraft gateway includes a first proxy agent, and the ground gateway includes a second proxy agent. The first proxy agent and the second proxy agent communicate a network packet for a number streams. The network packet includes a header and voice payloads for the streams.

20 Claims, 5 Drawing Sheets

(56) References Cited

U.S. PATENT DOCUMENTS

| | | | |
|---|---|---|---|
| 2008/0095150 A1* | 4/2008 | Lee | H04L 47/10 370/389 |
| 2008/0123839 A1* | 5/2008 | McCormack | H04M 3/523 379/265.02 |
| 2009/0016334 A1* | 1/2009 | Forsberg | H04W 28/06 370/389 |
| 2009/0219932 A1* | 9/2009 | Kobayashi | H04L 65/605 370/389 |
| 2009/0285150 A1* | 11/2009 | Ravishankar | H04B 7/18543 370/316 |
| 2010/0318577 A1* | 12/2010 | Camarillo | H04M 3/42365 707/802 |
| 2011/0064031 A1* | 3/2011 | Elmasry | H04L 63/0428 370/328 |
| 2011/0096762 A1* | 4/2011 | Basart | H04L 12/6418 370/338 |
| 2011/0116373 A1* | 5/2011 | Lauer | H01Q 1/007 370/232 |
| 2014/0088745 A1* | 3/2014 | Dudek | H04H 60/07 700/94 |
| 2014/0362850 A1* | 12/2014 | Wakely | H04L 65/608 370/352 |
| 2015/0351066 A1* | 12/2015 | Lauer | H04W 60/04 455/405 |
| 2016/0119938 A1* | 4/2016 | Frerking | H04W 72/10 370/316 |

* cited by examiner

LARGE VOLUME VOICE OVER IN INTERNET PROTOCOL SERVICES FOR AN AIRCRAFT

BACKGROUND

The inventive concepts disclosed herein relate generally to the field of communication systems. More particularly, embodiments of the inventive concepts disclosed herein relate to systems and methods for voice over internet protocol (VoIP) services.

U.S. Pat. No. 8,594,075 invented by George F. Elmasry and incorporated herein by reference in its entirety describes (VoIP) services over a military encrypted packet switch network. Voice call services or telephone communications for civilian aircraft passengers are generally expensive and are often limited to high-end luxury private aircraft. Commercial aircraft or airplanes often have hundreds of passengers who would like to use telephone communications simultaneously. The bandwidth demand from sharing wireless links to the ground for the telephone communications among a large number of passengers can exceed the available bandwidth and can cause bandwidth overprovisioning problems. Additionally, the ground-to-air wireless link to the aircraft can introduce packet drop, packet delay and packet delay variation (jitter).

SUMMARY

In one aspect, the inventive concepts disclosed herein are directed to a VoIP system for an aircraft. The system includes a ground gateway, an aircraft gateway disposed on the aircraft, and a service provider network or communications links between the aircraft and the ground. The ground gateway is in communication with the aircraft gateway via the service provider network or the communications links. The aircraft gateway includes a first proxy agent, and the ground gateway includes a second proxy agent. The first proxy agent communicates to the second proxy agent network packets for independent VoIP streams. A VoIP communication packet includes a variety of headers and an encoded voice payload for its corresponding stream.

In another aspect, the inventive concepts disclosed herein are directed to a VoIP system for an aircraft including an aircraft gateway disposed on the aircraft and in communication with a ground gateway through a service provider network or communications links between the ground and the aircraft. The ground gateway includes a first proxy agent and the aircraft gateway includes a second proxy agent. The first proxy agent communicates to the second proxy agent network packets for independent VoIP streams. A VoIP communication packet includes a variety of headers and an encoded voice payload for its corresponding stream.

In a further aspect, the inventive concepts disclosed herein are directed to a method of providing large volume VoIP services for an aircraft. The method includes receiving a plurality of streams on an aircraft. The streams each include VoIP packets associated with an established VoIP call between the ground and the aircraft, and each VoIP packet includes a variety of headers and an encoded voice payload and is distant to the ground. The method also includes providing a concatenated payload including the voice payloads from each of the VoIP packets simultaneously entering the aircraft gateway and instantiated on the aircraft, and providing a compound header for the concatenated payload to form a new communications packet. The compound header includes an internet protocol (IP) header and an amendment. The IP header includes an IP address of the aircraft gateway interface to the ground gateway as the source address and an IP address of the ground gateway interface to the aircraft gateway as the destination address. The method also includes routing the network packet through the service provider network or a wireless communication medium to send the concatenated packet to the ground gateway. The method also includes enabling the ground gateway to recover the original VoIP packets from the concatenated packet.

In a further aspect, the inventive concepts disclosed herein are directed to a VoIP system for communications between a ground PBX and an aircraft. The VoIP system includes an aircraft gateway disposed on the aircraft and configured to process a plurality of streams of VoIP packets. Each stream is associated with a user aboard the aircraft, and each of the VoIP packets includes headers and a voice payload. The aircraft gateway is configured to provide to the ground gateway a communication packet including the voice payload for each stream and a compound header. The compound header includes an internet protocol header comprising a source address of the aircraft gateway and a destination address of the ground gateway and an amendment comprising header information for each stream.

In a further aspect, the inventive concepts disclosed herein are directed to a method of providing large volume VoIP services for an aircraft. The method includes receiving a plurality of streams on the ground gateway. The streams each include VoIP packets associated with an established VoIP call between the ground and the aircraft, and each VoIP packet includes a variety of headers and an encoded voice payload distant to the aircraft. The method also includes providing a concatenated payload including the voice payloads from each of the VoIP packets simultaneously entering the ground gateway and instantiated on the ground, and providing a compound header for the concatenated payload to form a new communications packet. The compound header includes an internet protocol (IP) header and an amendment. The IP header includes an IP address of the ground gateway interface to the aircraft gateway as the source address and an IP address of the aircraft gateway interface to the ground gateway as the destination address. The method also includes routing the network packet through the service provider network or a wireless communication medium to send the concatenated packet to the aircraft gateway. The method also includes enabling the aircraft gateway to recover the original VoIP packets from the concatenated packet.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
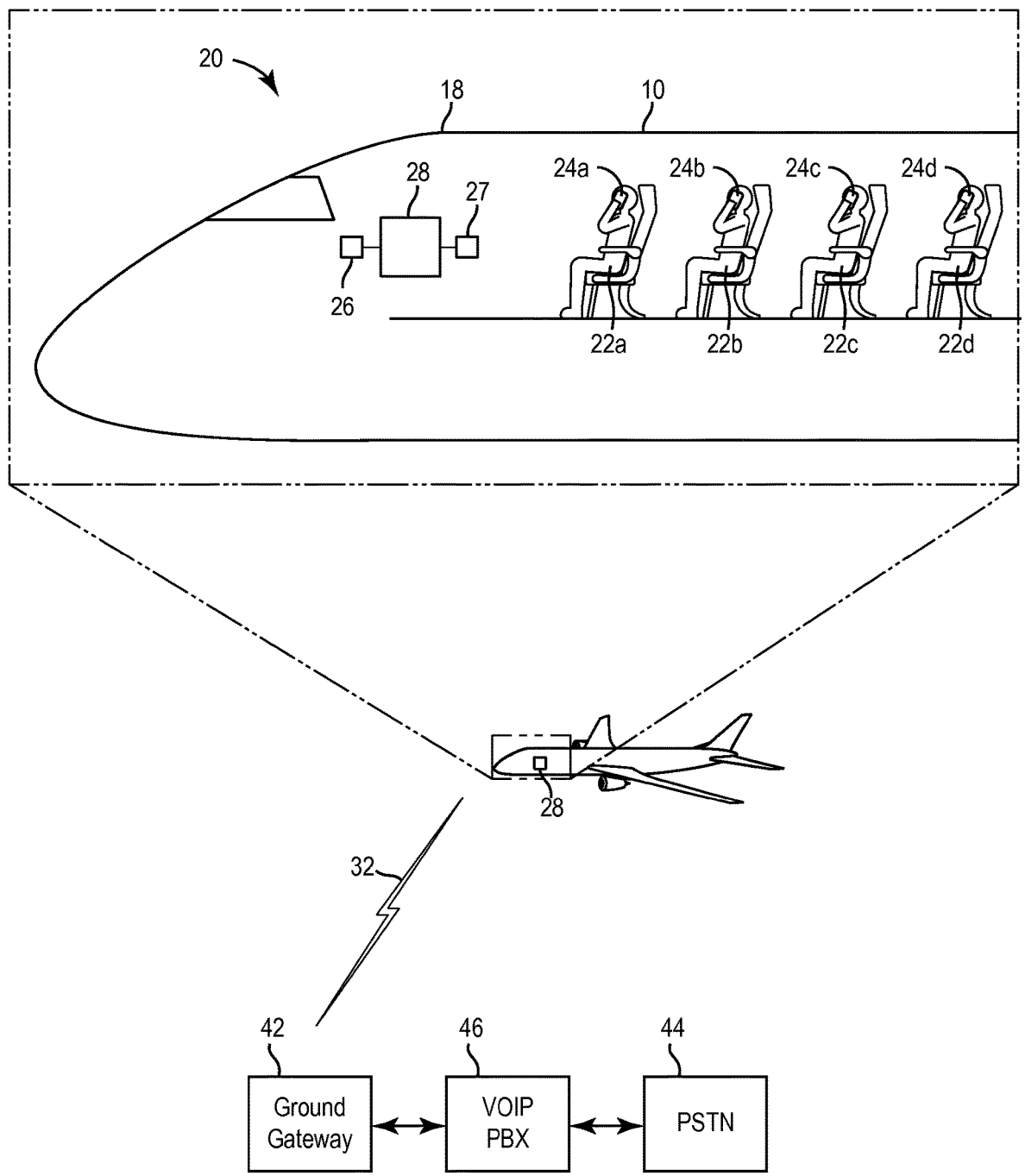
FIG. 1 is a schematic illustration of VoIP communication system for an aircraft including a VoIP airborne gateway in communication with a public switched telephone network according to exemplary aspects of the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), or both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

Embodiments of the inventive concepts disclosed herein are directed to systems and methods of offering passengers on board a commercial aircraft VoIP services that are reliable and low cost without requiring large amounts of bandwidth. In some embodiments, the systems and methods address unique characteristics of the aircraft-to-ground communications links and the unique challenges associated with a ground gateway that has connectivity to the public switched network. The systems and methods use different components that work together to optimize the performance of VoIP sessions given the unique environments associated with aircraft and to offer VoIP services to every passenger on the aircraft even where a large volume of calls in parallel are required. In some embodiments, the systems and methods are configured to provide aircraft VoIP services that are reliable, low cost and minimize the use of bandwidth. The systems and methods balance computational power, bandwidth and reliability in a delicate manner in order to make offering VoIP services to every passenger possible and at an acceptable Quality of Service (QoS).

In some embodiments, the system and method provide aircraft VoIP services using five features that work together to make large volume VoIP services for commercial aircraft passengers possible. The five features include VoIP call control proxies, a concatenated voice payload for multiple streams, a compound header for the multiple streams, duplicate concatenated payloads in the network packet, and jitter mitigation. The system and method uses a Software Define Networking (SDN) platform as part of the aircraft gateway (e.g., the airborne gateway) and a SDN platform as part of the ground gateway in some embodiments. In the context of cloud computing, the system and method advantageously pushes VoIP services to the edge and accesses ground telephony services through the ground gateway in some embodiments. The edge here references the ground to air peripheral network cloud.

With reference to FIG. 1, an aircraft 10 includes a VoIP communication system 20. The aircraft houses passengers 22a-m with access to VoIP services via the VOIP system 20. (where m is an integer). The passengers have terminals, handsets or devices 24a-m. The VoIP communication system 20 includes a wide area network (WAN) interface unit 26, a local area network (LAN) interface unit 27, an aircraft gateway 28, a wireless communications media or a service provider network 32, and a ground gateway 42. The ground gateway 42 is coupled to or in communication with a telephone network such as a plain old telephone system (POTS) or public switched telephone network (PSTN) 44 via a VoIP private branch exchange (PBX) 46. The aircraft gateway 28 is coupled with or in communication with the communications media or service provider network 32 via a wide area network (WAN) interface unit 26 The aircraft gateway 28 is coupled with or in communication with the devices 24a-m via a local area network (LAN) interface unit 27. The ground gateway 42 is in communication with the service provider network 32.

The devices 24a-m can reside on cellular phones (e.g., smart phones), lap top computers, tablets, as a smart application or can be in-seat telephone units, or other communication devices. The devices 24a-m can also be specialized transmitting or receiving VoIP terminals. The devices 24a-m function as a telephone configured for use with the VoIP communication system 20. Each device 24a-m includes a processor unit, a memory, and communication hardware. The memory stores one or more programs which, when executed by the processor, facilitate operation of the devices 24a-m within the VoIP communication system 20.

In some embodiments, the aircraft 10 communicates with the service provider network 32 via a wide area network (WAN) interface communication unit 26 (FIG. 2) which can include a data radio for providing off aircraft communications. In some embodiments, the WAN interface unit 26 can interface to an L-Band Low Earth Orbit (LEO), a Ku band geosynchronous (GEO), or a Ka band GEO satellite radio. In some embodiments, the service provider network 32 is a private network or a broadband satellite network to provide communications to a ground commercial wireless network (e.g., a receiving station coupled to the ground gateway 42 via a satellite network) and includes the equipment for communicating with such networks.

The aircraft gateway 28 is a network device for processing communications between the service provider network 32 and the devices 24a-m. The aircraft gateway 28 is aboard the aircraft 10 and includes an SDN platform in some embodiments. The aircraft gateway 28 is coupled wirelessly or via wired connection to the devices 24a-m. The ground gateway 42 is a peer to the aircraft gateway 28 and is a network device for processing communications between the service provider network 32 and the VoIP PBX 46. The ground gateway 42 is remote from the aircraft 10 (e.g., is a fixed land based network device) and includes an SDN platform in some embodiments. The ground gateway 42 is configured to provide a first proxy agent as a service relay point to the aircraft 10 and works with a second proxy agent of the aircraft gateway 28 to provide the VoIP services.

The VoIP PBX 46 converts VoIP formats into PSTN formats for downstream data (from the aircraft 10 to the ground) and vice versa for upstream data (from the ground to the aircraft) and maps the VoIP session initiation protocol (SIP) to the PSTN format for the PSTN 44. The VoIP PBX 46 is a commercial off the shelf unit and serves as a bridge between telephony services and the cloud of aircraft nodes such as the node associated with the VoIP communication system 20 of the aircraft 10 in some embodiments.

The VoIP communication system 20 is configured to provide the first proxy agent for the VoIP call controller of the VoIP PBX 46 over the ground gateway 42 and is configured to provide the second proxy agent over the aircraft gateway 28. The first and second proxy agents are peered together to ensure that the VoIP communications can be used seamlessly and reliably between the cabin of the aircraft 10 and the ground even when there is a large volume of calls in parallel in some embodiments. The first and second proxy agents relay the voice communications control packets such as SIP packets without change to ensure that VoIP sessions are initiated as defined by commercial standards in some embodiments.

The first and second proxy agents manipulate the actual VoIP packets as described below to increase volume capabilities in some embodiments. The ground gateway 42 concatenates upstream data for transmission to the aircraft 10 and deconcatenates downstream data for transmission to the VOIP PBX 46. The aircraft gateway 28 concatenates downstream stream data for transmission to the ground and deconcatenates upstream data for transmission to the user devices 24a-m.

Figure 2:
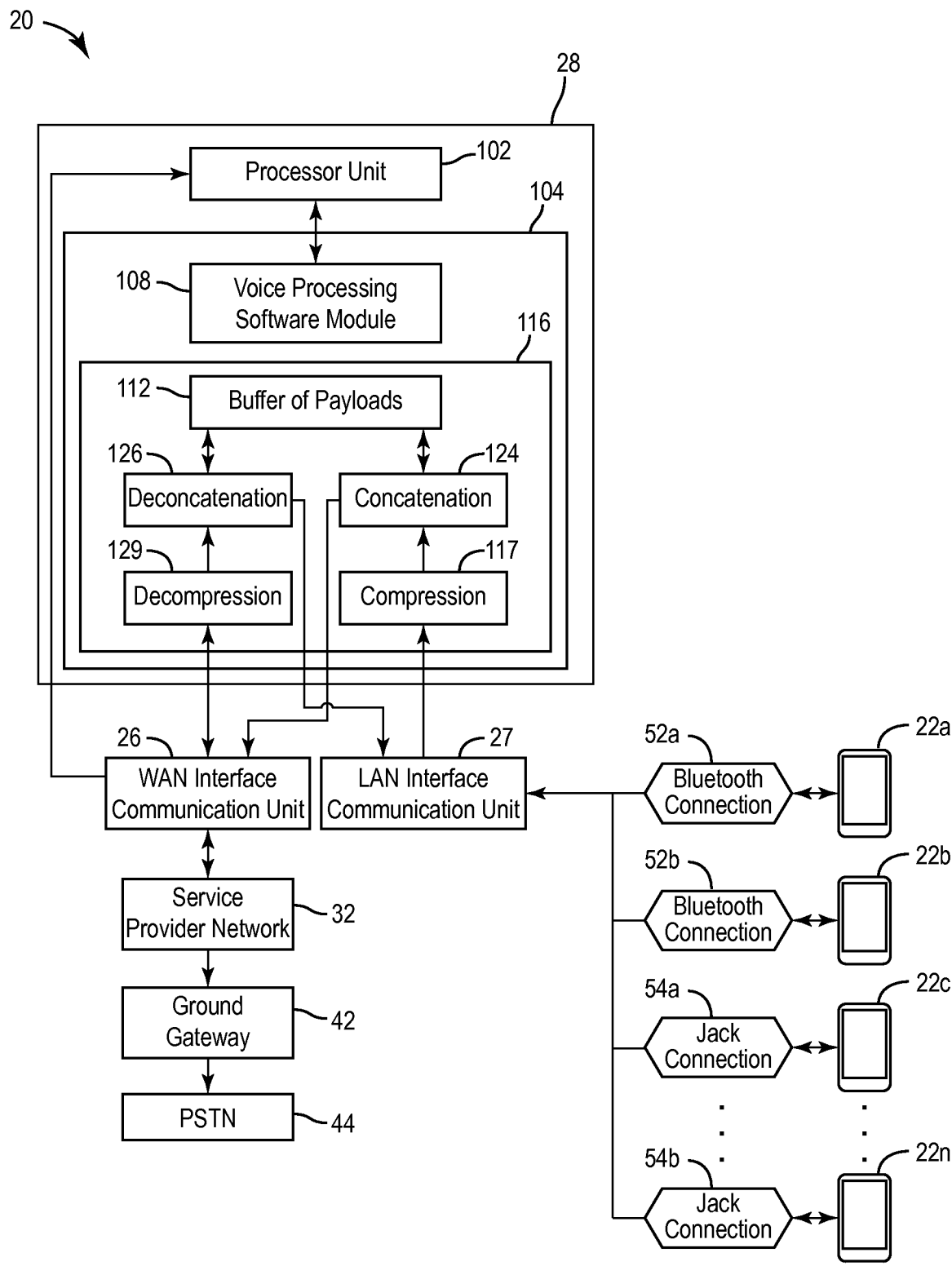
FIG. 2 is a general block diagram of the VoIP communication system including the VoIP airborne gateway illustrated in FIG. 1 according to exemplary aspects of the inventive concepts disclosed herein.

With reference to FIG. 2, the devices 24a-m are in communication with the aircraft gateway via Bluetooth links 52a-b, jack links 54a-b, or other wireless/wired links. Each device 24a-m can be associated with a single communication stream (e.g., a telephone conversation) processed by the VoIP communication system 20.

In some embodiments, the devices 24a-b include a voice application (e.g., a voice codec such as a G.729 codec), a communications application, and a payload module for processing both downstream and upstream data streams across Bluetooth links 52a-b, the jacks 54a-m, or other wireless or wired data links. The Bluetooth links 52a-b provide digital data representing voice (e.g., a G.729 voice codec packets) between the devices 24a-b and the aircraft gateway 28 across the Bluetooth links 52a-b.

The devices 24c-m are in communication with the aircraft gateway 28 and are coupled to the aircraft gateway 28 via the jack links 54a-b. The jack links 54a-b can be connected to the jack interface of a phone, tablet or computer. Digital data representing voice (e.g., a G.729 voice codec packets) can be provided across the jack links 54a-b or other link to the aircraft gateway 28.

As shown in FIG. 2, the aircraft gateway 28 includes a processor unit 102 and a memory 104 and is coupled to the WAN interface unit 26 and the LAN interface unit 27. The processor unit 102 is coupled to the memory 104, the WAN interface unit 26 and the LAN interface unit 27. The memory 104 contains one or more programs or modules which, when executed by the processor unit 102, facilitate operability of the VoIP communication system 20. In some embodiments, the memory 104 comprises a voice processing software module 108, and a payload processing module 116. The voice processing software module 108 processes communications to and from the WAN interface unit 26 and the LAN interface unit 27.

Downstream (e.g., voice data from the aircraft 10 to the ground) packets from multiple links or streams are buffered in the buffer 112, and payloads from multiple links or streams are concatenated by a concatenator 124. The outputs of the concatenator 124 are compressed by compression module 117 in some embodiments. The compression module 117 provides header compression as opposed to payload compression in some embodiments. The header compression provides a compound header that carries the minimum amount of data needed to recover the original headers of the concatenated packets in some embodiments. The output of the concatenator 124 and the compressor 117 are provided through the WAN interface unit 26 to the service provider network 32 for transmission to the ground gateway 42.

Upstream packets (e.g., voice data from the ground to the aircraft 10) from multiple links or streams are buffered in the buffer 112 and the payloads form multiple links or streams are deconcatenated by a deconcatenator 126. The upstream compound header data are decompressed by a decompressor 129. The deconcatenated packets with decompressed headers are exact copies of the original VoIP packets received by the ground proxy to send to the aircraft and are provided as VoIP streams for reception by the devices 24a-m via the LAN interface unit 27.

At least some of the elements associated with the packet processing in the aircraft gateway 28 can be realized in hardware. In some embodiments, payloads are processed at an IP layer of the aircraft gateway 28. The LAN interface unit 27 includes circuits for connecting the devices 24a-m to the processor unit 102 and circuits for facilitating wireless VoIP communications including transmitters, receivers, and operator controls, among other devices. The WAN interface unit 26 includes circuits for connecting the service provider network 32 to the processor unit 102 and circuits for facilitating wireless VoIP communications including transmitters, receivers, and operator controls, among other devices. The ground gateway 42 includes modules and circuitry for concatenation and deconcatenation similar to the modules and circuitry described above with respect to FIG. 2.

Figure 3:
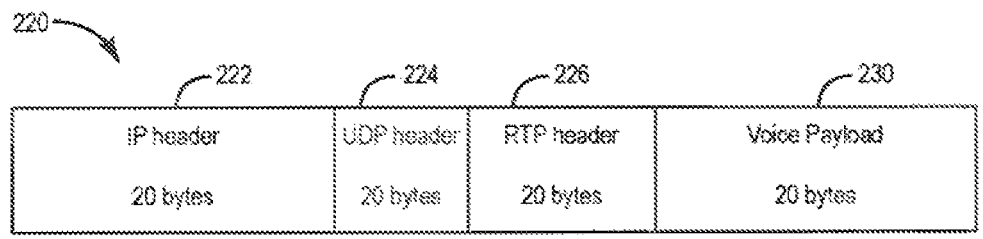
FIG. 3 is a schematic representation of a voice packet for the VoIP communication system illustrated in FIG. 1 according to exemplary aspects of the inventive concepts disclosed herein.
Figure 4:
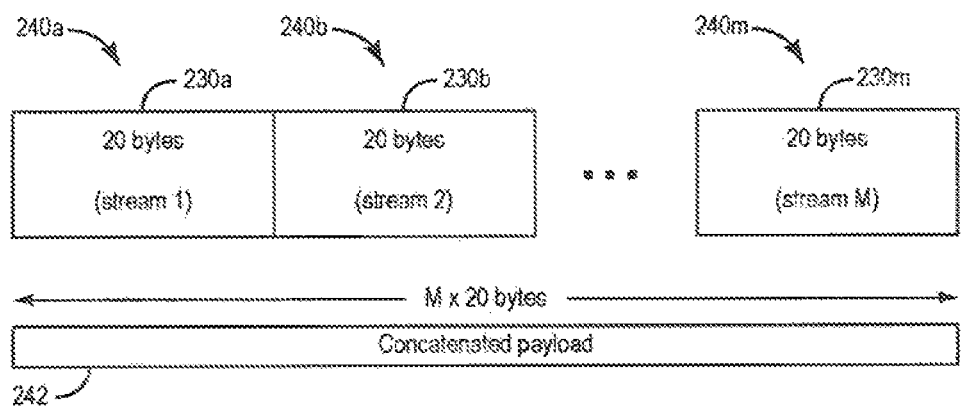
FIG. 4 is a schematic representation of a concatenated packet payload for the communication system illustrated in FIG. 2 according to exemplary aspects of the inventive concepts disclosed herein.

With reference to FIGS. 3-4, a communication packet or voice packet 220 (e.g., a G.729 voice codec packet) includes an internet protocol (IP) header field 222, a user datagram protocol (UPD) header field 224, a real-time transport protocol (RTP) header field 226, and a voice payload 230. The voice packet 220 is an encoded payload and is emitted at a rate of 50 packets per second for a communication stream in some embodiments. The IP header field 222 contains 20 bytes, the UPD header field contains 8 bytes, and the RTP header field 226 contains 12 bytes in some embodiments. The voice payload 230 contains 20 bytes and carries the voice information while the IP header field 222, the UPD header field 224, and the RTP header field 226 contain header information.

At any given time, m VoIP users use the VoIP communication system 20 in parallel (where m is an integer). With m parallel streams 240a-m (FIG. 4) of voice flowing between the aircraft gateway 28 and the ground gateway 42, a concatenated voice payload 242 (FIG. 4) (e.g., containing m voice payloads 230a-m) has a size of m*20 bytes. In some embodiments, the 20 byte size of each of payloads 230a-m is a fixed size unless the codec uses silence suppression. If silence suppression is used, the 20 byte size may not be a fixed size (e.g., 20 bytes, less than 20 bytes, or the codec may not emit any bytes for a 20 msec interval). If a fixed size is used (e.g., silence suppression is not used), reference points in the concatenated payload 242 are not needed according to some embodiments. If silence suppression is used, reference points are inserted into the concatenated payload 242 to mark the end of one payload and the start of another.

The concatenator 124 (FIG. 2) of the aircraft gateway 28 concatenates the voice payloads 230a-m from the parallel users of VoIP communication system 20 to form the concatenated packet payload 242. Each user emits 50 packets per second, and each packet has a 20 byte payload and a 40 byte header (e.g., the IP header field 222, the UPD header field 224, and the RTP header field 226 for UDP and IPv4 communications) in some embodiments. A G.729 VoIP codec over IPv4 can use such a packet; other codecs can use different packet specifications.

Figure 5:
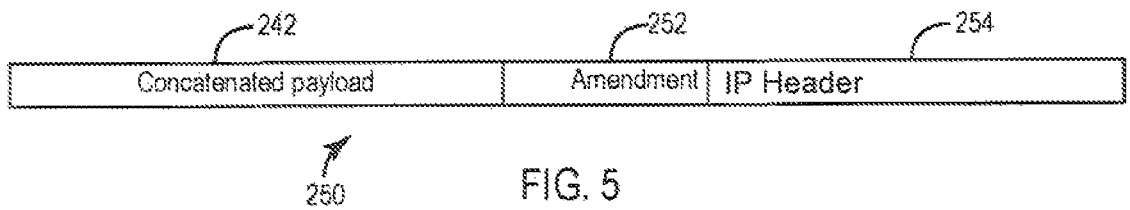
FIG. 5 is a schematic representation of a network packet for multiple streams including a compound header and a concatenated packet payload for the communication system illustrated in FIG. 2 according to exemplary aspects of the inventive concepts disclosed herein.

Header compression is described below with reference to FIG. 5. A network packet 248 for the multiple streams 240a-m (FIG. 4) includes a compound header 250 and the concatenated payload 242. The compound header 250 is provided by the compressor 117 (FIG. 2) for the concatenated payload 242 and includes an IP header 254 and an amendment 252. The aircraft gateway 28 has a wide area network (WAN) interface to the ground gateway 42 that has a specific IP address. The ground gateway 42 has an interface to the aircraft 10 that has a specific IP address. These specific IP addresses are used to create the IP header 254 for the concatenated payload 242.

The amendment 252 for the network packet 248 provides the minimum amount of information that allows the ground gateway 42 to recreate the headers for each of the VoIP packet streams 240a-m (e.g., the IP header field 222, the UPD header field 224, and the RTP header field 226 for UDP and IPv4 communications). The amendment 252 includes m different segments, where each segment corresponds to the IP, UDP and RTP headers of a single VoIP stream. The VoIP communication system 20 can be configured to use a sequence of bits to separate each segment or to use a fixed-size byte length for each segment.

In some embodiments, the proxy agent of the aircraft gateway 28 concatenates the voice payloads 230a-m using a scheduler that can concatenate the m voice payloads 230a-m together every 20 msec for the downlink traffic and relies on the proxy agent of the ground gateway 42 to reverse the concatenation (e.g., to deconcatenate). For the uplink traffic, the proxy agent of the ground gateway 42 concatenates the m voice payloads 230a-m provided by the VoIP PBX 46 and relies upon the aircraft gateway 28 to reverse the concatenation.

In some embodiments, the scheduler creates the concatenated packet payload 242 every 20 msec, with the voice payloads 230a-m from each of the m streams 240a-m. If silence suppression is used, the voice payloads 230a-m with less than 20 bytes are padded or a variable length byte concatenation methodology is used where a sequence of bits is dedicated to mark the end of one payload and the start of the next. Advantageously, the concatenator 124 and the compressor 117 produce packets on the downlink (from the aircraft 10 to the ground), and the ground gateway 42 reverses the concatenation (e.g., is able to recover the m original packet payloads from the concatenated payload 242 and know that the first segment belongs to the first stream, the second segment belongs to the second stream; the third segment belongs to the third stream, and so on) and reverse the header compression. Similarly, a concatenator and headercompressor in the ground gateway 42 concatenates and compresses the upstream which is reversed by the deconcatenator 126 and decompressor 129 at the aircraft gateway 28 without the loss of any information.

In some embodiments many of the fields of the IP, UDP and RTP header fields 222, 224, and 226 are fixed during the VoIP session and can be eliminated during the transmission between the air-to-ground segment and reconstructed at the receiving end (e.g., at the ground gateway 42). Fixed fields that can be eliminated include the IP source and IP destination addresses for each VoIP stream and the source port and the destination port of each stream. There are also header fields that can be calculated at the receiving end and hence can be eliminated during the transmission between the air-to-ground segments. These re-calculable fields include checksum, length, TTL, time stamp and sequence number.

The network packet 248 has concatenated payloads and compressed headers and the proxy agents can be configured to reconstruct the original VoIP packet headers after reverse concatenation. This compressed header information 252 can be sent as an option field in the network packet 248. The packet sequence number for the voice payloads 230*a-m* is incremented by one for each sequential payload 230*a-m* in some embodiments. In some embodiments, the packet sequence number can be sent every n voice payloads 230*a-m* for reference in the amendments 252 (where n is an integer). The IP source and IP destination addresses for each stream are fixed during the VoIP session and the IP source and IP destination addresses can be sent every n payloads 230*a-m* for reference in some embodiments. The IP source and IP destination addresses are eliminated for most of the concatenated payloads 202. Other header fields are exact copies of the same information known through the SIP protocol packets and can be reconstructed from SIP packets. Accordingly, the size of the amendment 252 has a size much less than 40*m where m is the number of VoIP streams 240*a-m* going in parallel and 40 is the assumed cumulative size of the IP, UDP and RTP headers.

Figure 6:
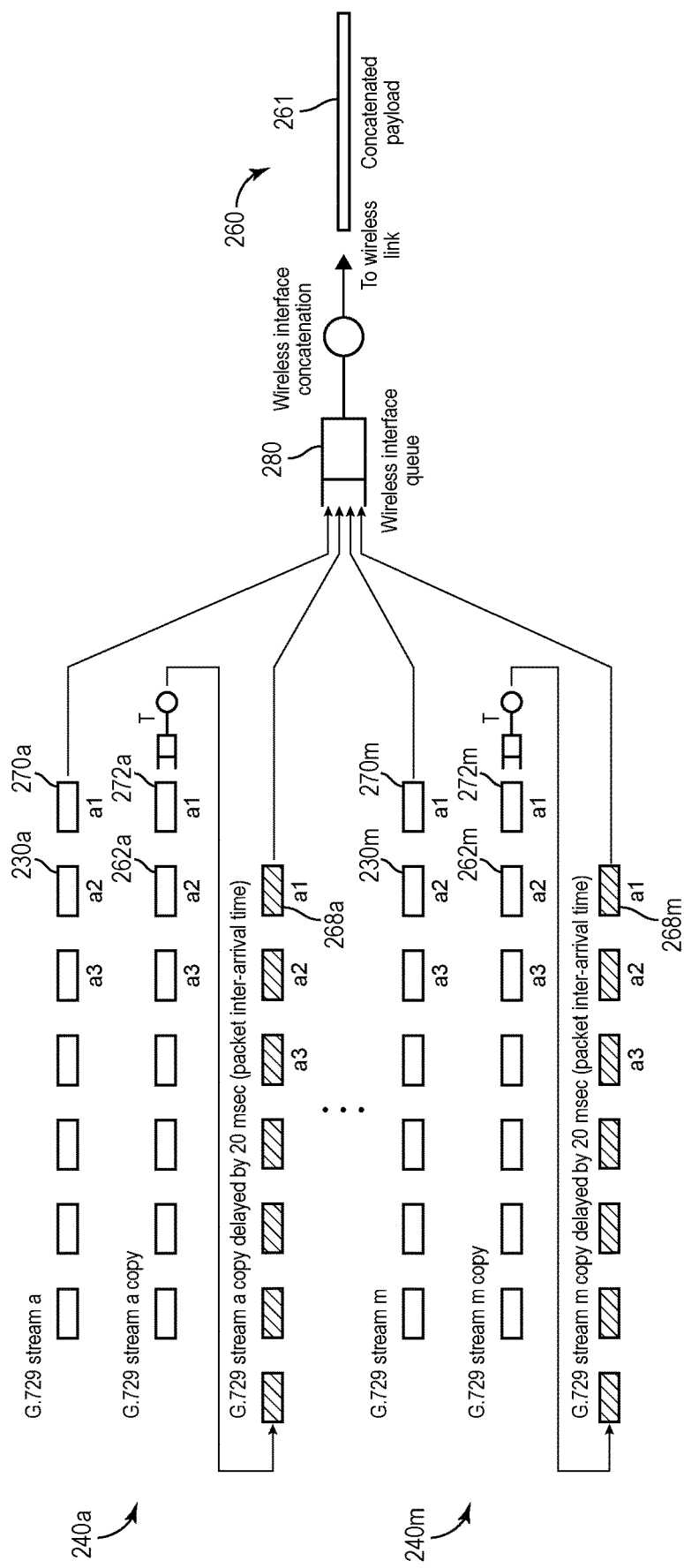
FIG. 6 is a schematic representation of concatenation of packet payloads to form an interleaved network packet for the communication system illustrated in FIG. 2 according to exemplary aspects of the inventive concepts disclosed herein.

With reference to FIG. 6, an interleaved network packet 260 with a concatenated payload 261 is similar to the network packet 248 (FIG. 5) and provided by the operation of concatenator 124 and compressor 117 in some embodiments. The interleaved network packet 260 includes the payloads 230*a-m* for each of streams 240*a-m* (similar to the network packet 248 with the concatenated payload 242 as described in FIGS. 4-5). The payloads 230*a-m* carry information a2a-m. The concatenated payload 261 of the interleaved network packet 260 also includes delayed copies 268*a-m* of payloads 270*a-m* for each of the streams 240*a-m*. The delayed copies 268*a-m* carry information ala-m. Copies 272*a-m* (carrying information ala-m) of the payloads 270*a-m* are delayed (e.g., by 20 ms) with respect to the payloads 270*a-m* using delay queues 264*a-m* and a server and provided as the delayed copies 268*a-m* to a wireless interface queue 280.

Figure 7:
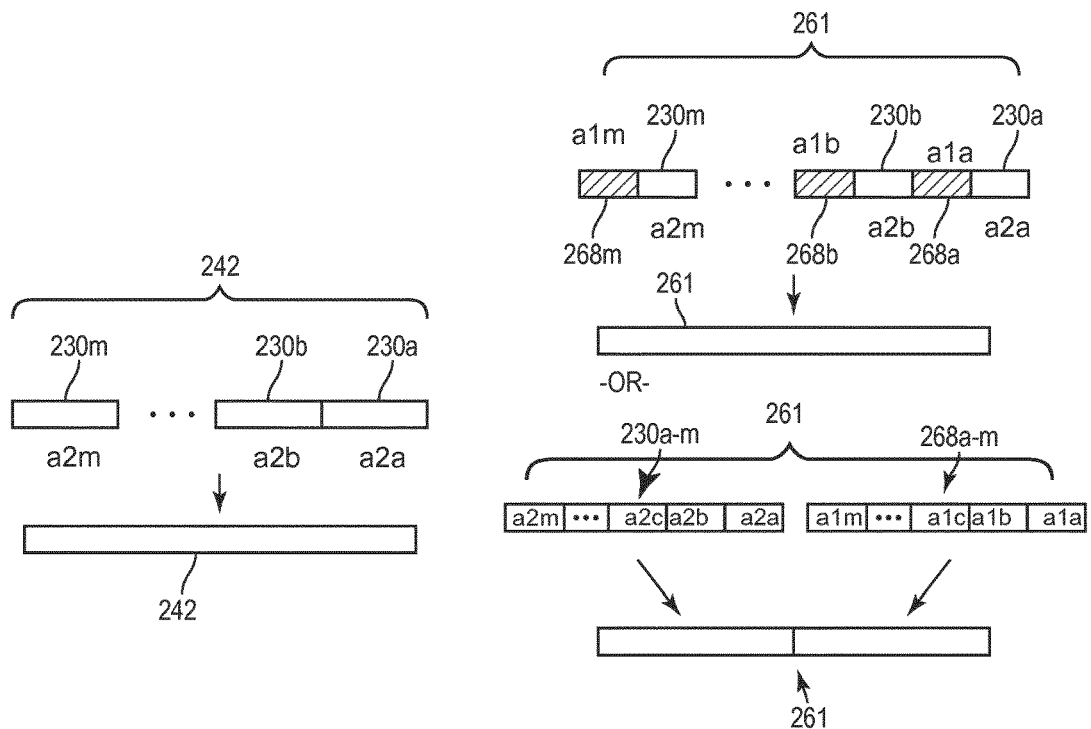
FIG. 7 is a schematic representation showing a comparison of the network packet illustrated in FIG. 5 and the interleaved network packet of FIG. 6.

When the delayed copies 268*a-m* (delayed stream payloads) are combined with the payloads 230*a-m* in the wireless interface queue 280, the end result is the concatenated payload 261 that is doubled in size from 20*M to 2*20*M bytes when compared to the concatenated payload 242 as shown in FIG. 7. The concatenated payload 261 can be interstitial with payloads 230*a* and 268*a*, 230*b* and 268*b*, 230*m* and 268*m* directly next to each other or non-interstitial with the set of payloads 230*a-m* next to the set of payloads 268*a-m*.

In some embodiments, only the delayed copies 268*a-m* are respectively combined with the payloads 230*a-m* that follow the payloads 270*a-m*. The repeat of the delayed copies 268*a-m* with the payloads 230*a-m* allows the proxy agents to overcome packet loss over wireless links between the ground and aircraft gateways 28 and 42. If the interleaved network packet 260 is lost, its information can be recovered from the next network packet at the receiving end (e.g., with a delay of 20 ms). The quality of the VoIP streams is greatly advanced because consecutive or adjacent packets have to be lost for the codec to lose the information of the packet. When packet loss reaches 9 percent, the call is perceived to be degraded and unacceptable to the user. The VoIP communication system 20 advantageously can reduce the effective packet loss from 0.1 (10%) to 0.01 (1%) assuming random packet loss, thus giving the user a perceived acceptable VoIP quality in spite of a high packet loss introduced by the wireless media or the service provider network.

For any VoIP stream, the interleaved network packet 260 (e.g., the concatenated payloads with compressed header packet with redundancy) makes it possible to recover the entire payload as well as the entirety of the IP, UDP and RTP header information in some embodiments. For the IP header fields, many fields are the same such as version, header length, and service type. If silence suppression is not enabled, the total length is the same. Fields such as the TTL under IP protocol are predictable and should be the same as the previous packet (assuming the packets used the same path). The protocol field is fixed for the entire steam. For the RTP header field 226 (FIG. 3), the packet sequence numbering is predictable (previous+1 to the given base); the time stamp would be the previous time stamp+20 msec. The SSRC identifier and CSRC identifiers are the same as the previous packet in some embodiments. For the UDP header field 224, the source and destination ports are the same, and if silence suppression is not used, the length part of that header is fixed. The checksum can be created of the reconstructed UDP header at the receiving end from the other three header parts.

Figure 8:
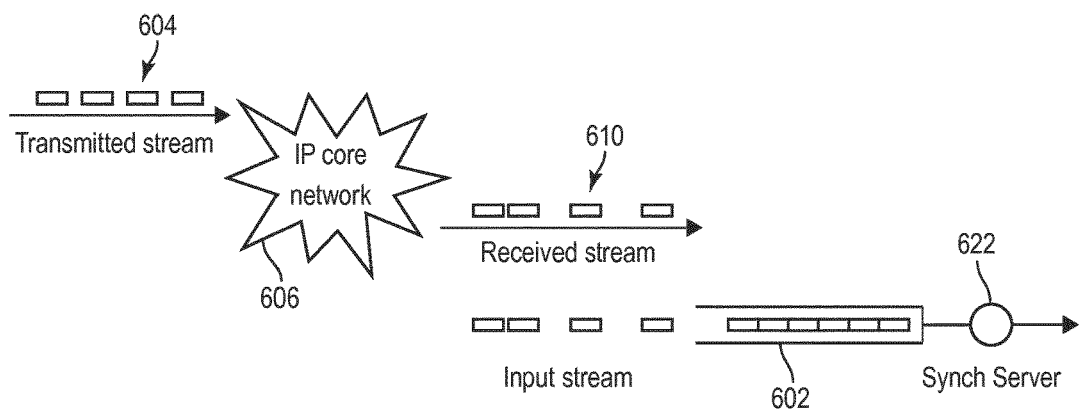
FIG. 8 is a schematic representation of a jitter buffer for the communication system illustrated in FIG. 2 according to exemplary aspects of the inventive concepts disclosed herein.

With reference to FIG. 8, the VoIP communication system 20 (FIG. 1) is configured to reduce jitter or delay variation that can occur between the aircraft 10 and the ground due to the use of the commercial infrastructure and cockpit traffic at the gateways 28 and 42 causing variable queuing delay for the VoIP stream. The cockpit traffic has higher precedence enforced by queueing techniques. Although the codecs in the VoIP communication system 20 have jitter absorption buffers, the VoIP communication system 20 includes another layer of jitter absorption using a jitter buffer 602. A VoIP transmitted stream 604 (of interleaved network packets 260) enters an IP core network 606 that causes this delay variation. The ground gateway received stream 610 is not clocked as the original stream. The ground gateway received stream 610 becomes an input stream 612 for the jitter buffer 602 that uses a synchronized server 622 to re-clock the packet stream before entering the VoIP PBX 46. A similar jitter absorption technique would exist onboard the aircraft gateway to smooth the effect of delay variation on packet streams entering the aircraft and distant for the users VoIP decoders. The use of the jitter buffer 602 trades jitter mitigation for constant delay in some embodiments. The components of the VoIP communication system 20 work together to ensure that such service can be offered from a gateway perspective instead of from an application layer perspective.

This service is superior to a VoIP application over a mobile device that can utilize WiFi access over the aircraft in some embodiments. First, the robustness offered by repeating payloads between consecutive VoIP packets overcomes packet loss. Second, the jitter buffer 602 can avoid further loss of packets at the codec. The jitter buffer existing in the VoIP decoder adapts to measured delay variation by expanding and shrinking the buffer depth. This adaptation can fail sometimes since packet delay becomes unpredictable in many cases and the decoder drops packets that are delayed extensively. The VoIP communication system 20 (with the jitter buffer 602) eases up the burden on the VoIP decoder jitter buffer and the consolidation of VoIP calls that saves bandwidth. Third, the ability of the aircraft and ground gateways 28 and 42 to offer differentiated services to VoIP over data ensures that the offered VoIP services to aircraft passengers is superior to smart devices voice applications over data access and can be offered with less expense in some embodiments.

Figure 9:
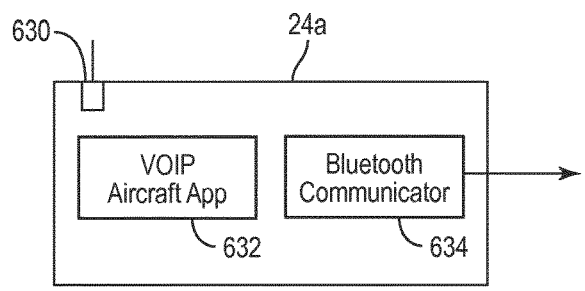
FIG. 9 is a schematic representation of a terminal for the communication system illustrated in FIG. 2 according to exemplary aspects of the inventive concepts disclosed herein.

With reference to FIG. 9, the device 24*a* is configured as a soft phone and includes an application 632 that provides operation with the VoIP communication system 20 via a jack 630 to the jack link 54*a* (e.g., passenger entertainment headphone jack) or the a Bluetooth transmitter receiver 634 to the Bluetooth link 52*a* (FIG. 2). The application 632 can allow a choice to use the jack link 54*a* or the Bluetooth link 52*a*.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried out in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A voice over internet protocol (VoIP) system for an aircraft comprising an aircraft gateway disposed on the aircraft in communication with a service provider network between the aircraft and ground, the VoIP system comprising:
   a ground gateway in communication with the aircraft gateway via the service provider network,
   wherein the ground gateway comprises a first proxy agent,
   wherein the first proxy agent communicates network packets for a plurality of parallel voice streams, each parallel voice stream associated with a conversation between a passenger of the aircraft and a ground-based user;
   wherein each parallel voice stream is comprised of VoIP communication packets comprising one or more VoIP headers and at least one voice payload,
   wherein each network packet comprises an IP header, an amendment, and a concatenated payload,
   wherein the concatenated payload consists of a plurality of the voice payloads from each parallel voice stream concatenated together,
   and
   wherein the amendment comprises information to recreate the one or more VoIP headers.

2. The VoIP system of claim 1, the aircraft gateway comprises a second proxy agent and the second proxy agent serves as a VoIP call controller of a VoIP PBX in communication with the ground gateway.

3. The VoIP system of claim 2, wherein the first and second proxy agents are peered together to ensure that VoIP communications can be used seamlessly and reliably between the aircraft and the ground even when there are a large volume of calls in parallel.

4. The VoIP system of claim 2, wherein the first and second proxy agents relay SIP packets without change to ensure that VoIP sessions are initiated.

5. The VoIP system of claim 1, wherein the concatenated payload is an interleaved payload comprising copies of the voice payloads from a prior time period.

6. The VoIP system of claim 5, wherein the voice payloads have a fixed size.

7. The VoIP system of claim 1, wherein the first proxy agent pads the voice payloads if silence suppression is used and the voice payloads are less than a fixed size.

8. The VoIP system of claim 1, each copy is provided immediately before or after the respective voice payload.

9. The VoIP system of claim 1, wherein the amendment comprises a plurality of segments, wherein the segments comprise a minimized set of information from an IP header field, a user datagram protocol (UDP) header field, and a real-time transport protocol (RTP) header field.

10. The VoIP system of claim 1, wherein the amendment comprises a plurality of segments.

11. The VoIP system of claim 9, wherein a number of the segments is equal to the number of streams and the number of streams is greater than 2.

12. The VoIP system of claim 1, further comprising:
   a jitter buffer outside of voice codecs configured to absorb delay variation resulting from the service provider network.

13. A method of providing large volume voice over internet protocol (VoIP) services for an aircraft, the method comprising:
   receiving a number of parallel voice streams on an aircraft, each parallel voice stream each comprising a VoIP packet, each VoIP packet comprising a plurality of VoIP headers and a voice payload;
   providing a concatenated payload consisting of a plurality of the voice payloads from each parallel voice stream concatenated together utilizing a concatenator in an aircraft gateway on the aircraft;
   providing a compound header for the concatenated payload to form a network packet, utilizing a compressor in the aircraft gateway, the compound header comprising an internet protocol (IP) header and an amendment, the IP header comprising an IP address of the aircraft gateway,
      wherein the compound header and the concatenated payload form a network packet,
      wherein the amendment comprises information to recreate the VoIP headers, wherein the number of streams is at least four, wherein each of the four parallel voice streams is associated with a unique conversation associated with a passenger of the aircraft; and
   providing the network packet to a service provider network to communicate the network packet to a destination off the aircraft.

14. The method of claim 13, wherein the amendment comprises a plurality of segments, wherein the segments each comprise minimum set of information from an IP header field for the voice payload of an associated stream, a user datagram protocol (UDP) header field, and a real-time transport protocol (RTP) header field.

15. The method of claim 13, wherein the amendment comprises a plurality of segments, wherein a number of the segments is equal to the number of streams.

16. The method of claim 14, wherein a number of the segments is equal to the number of streams.

17. A voice over internet protocol (VoIP) system for communications between a ground PBX and an aircraft, the system comprising:
   an aircraft gateway disposed on the aircraft and configured to process a plurality of parallel voice streams of VoIP packets, wherein each parallel voice stream is associated with a user aboard the aircraft, wherein each of the VoIP packets comprises a plurality of VoIP headers and a voice payload;

wherein the aircraft gateway is configured to provide a network packet comprising a concatenated payload, the concatenated payload consisting of a plurality of the voice payloads from each parallel voice stream concatenated together, and a compound header, wherein the compound header comprises an internet protocol header comprising an address of the aircraft gateway and an amendment comprising header information for each parallel voice stream, wherein the amendment comprises information to recreate the VoIP headers, and wherein each respective parallel voice stream corresponds to a respective conversation of a plurality of conversations occurring between the aircraft gateway and the ground PBX.

18. The system of claim 17, wherein the amendment comprises a plurality of segments, wherein the segments comprise the header information, the header information comprising information from an IP header field, a user datagram protocol (UDP) header field, and a real-time transport protocol (RTP) header field for each stream.

19. The system of claim 17, further comprising:
a jitter buffer outside of voice codecs configured to absorb delay variation resulting from wireless communications between the aircraft and ground.

20. The system of claim 17, wherein one of the voice payloads is a first voice payload from a first parallel voice stream and at least one second voice payload is from the first parallel voice stream, wherein the at least one second voice payload is from a previous VoIP packet of a VoIP packet associated with the first voice payload in the first parallel voice stream of the VoIP packet of the first voice payload.

* * * * *